United States Patent
Zinger et al.

(10) Patent No.: US 11,841,808 B2
(45) Date of Patent: Dec. 12, 2023

(54) SYSTEM AND METHOD FOR PROCESSING REQUESTS IN A MULTITHREADED SYSTEM

(71) Applicant: EMC IP Holding Company, LLC, Hopkinton, MA (US)

(72) Inventors: Eldad Zinger, Raanana (IL); Leonid Ravich, Raanana (IL); Elad Grupi, Tel Aviv (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 72 days.

(21) Appl. No.: 17/375,499

(22) Filed: Jul. 14, 2021

(65) Prior Publication Data

US 2023/0013913 A1  Jan. 19, 2023

(51) Int. Cl.
*G06F 13/16* (2006.01)
*G06F 9/48* (2006.01)

(52) U.S. Cl.
CPC ........ *G06F 13/1668* (2013.01); *G06F 9/4881* (2013.01)

(58) Field of Classification Search
None
See application file for complete search history.

(56) References Cited

U.S. PATENT DOCUMENTS

| 10,678,432 B1 * | 6/2020 | Dreier | G06F 3/0659 |
| 10,756,816 B1 * | 8/2020 | Dreier | H04L 49/357 |
| 2019/0187894 A1 * | 6/2019 | Benisty | G06F 13/4282 |
| 2020/0150734 A1 * | 5/2020 | Ma | G06F 1/3243 |
| 2020/0364163 A1 * | 11/2020 | Schauer | G06F 13/4282 |
| 2021/0294528 A1 * | 9/2021 | Tadokoro | G06F 3/0659 |

\* cited by examiner

*Primary Examiner* — Michael Sun
(74) *Attorney, Agent, or Firm* — Brian J. Colandreo; Heath M. Sargeant; Holland & Knight LLP (57) ABSTRACT

A method, computer program product, and computing system for associating a plurality of NVMe IO submission queues with an NVMe IO completion queue. An NVMe IO completion queue polling frequency may be defined for a plurality of threads configured to provide one or more IO requests to the plurality of NVMe IO submission queues. The NVMe IO completion queue may be polled based upon, at least in part, the NVMe IO completion queue polling frequency defined for the plurality of threads.

17 Claims, 5 Drawing Sheets

SYSTEM AND METHOD FOR PROCESSING REQUESTS IN A MULTITHREADED SYSTEM

BACKGROUND

Storing and safeguarding electronic content may be beneficial in modern business and elsewhere. Accordingly, various methodologies may be employed to communicate data to and from storage arrays more efficiently.

For example, input/output (IO) request processing latency in multithreaded systems with non-volatile memory express (NVMe) storage devices may be based upon, at least in part, latency associated with processing completion entries of a completion queue associated with the NVMe storage devices. Conventional approaches typically use interrupts or polling for recognizing entries in the completion queue. When polling, if a task scheduler schedules polling very rapidly, then the added IO latency from polling may be small. As such, to obtain a low IO latency, the completion queue may be polled rapidly. However, polling consumes CPU resources, even if no entries are identified in the completion queue. As such, conventional approaches for processing IO requests in multithreaded systems with NVMe storage devices tradeoff CPU resource consumption for IO latency.

SUMMARY OF DISCLOSURE

In one example implementation, a computer-implemented method executed on a computing device may include but is not limited to associating a plurality of NVMe IO submission queues with an NVMe IO completion queue. An NVMe IO completion queue polling frequency may be defined for a plurality of threads configured to provide one or more IO requests to the plurality of NVMe IO submission queues. The NVMe IO completion queue may be polled based upon, at least in part, the NVMe IO completion queue polling frequency defined for the plurality of threads.

One or more of the following example features may be included. Each NVMe IO submission queue of the plurality of NVMe IO submission queues may be associated with a specific thread of the plurality of threads. One or more IO requests may be provided, via the plurality of threads, to an NVMe IO submission queue associated with a specific thread of the plurality of threads. The one or more IO requests from the plurality of NVMe IO submission queues may be processed on one or more NVMe storage devices. In response to processing the one or more IO requests from the plurality of NVMe IO submission queues on the one or more NVMe storage devices, an NVMe IO completion entry for each IO request may be provided to the NVMe IO completion queue, thus defining one or more NVMe IO completion entries. Polling, via the plurality of threads, the NVMe IO completion queue based upon, at least in part, the NVMe IO completion queue polling frequency defined for the plurality of threads may include processing, via the plurality of threads, the one or more NVMe IO completion entries from the NVMe IO completion queue. Polling, via the plurality of threads, the NVMe IO completion queue based upon, at least in part, the NVMe IO completion queue polling frequency defined for the plurality of threads may include determining, via a first thread, whether the NVMe IO completion queue is being held by a second thread; and in response to determining that the NVMe IO completion queue is being held by the second thread, forgoing the polling of the NVMe IO completion queue by the first thread.

In another example implementation, a computer program product resides on a computer readable medium that has a plurality of instructions stored on it. When executed by a processor, the instructions cause the processor to perform operations that may include but are not limited to associating a plurality of NVMe IO submission queues with an NVMe IO completion queue. An NVMe IO completion queue polling frequency may be defined for a plurality of threads configured to provide one or more IO requests to the plurality of NVMe IO submission queues. The NVMe IO completion queue may be polled based upon, at least in part, the NVMe IO completion queue polling frequency defined for the plurality of threads.

One or more of the following example features may be included. Each NVMe IO submission queue of the plurality of NVMe IO submission queues may be associated with a specific thread of the plurality of threads. One or more IO requests may be provided, via the plurality of threads, to an NVMe IO submission queue associated with a specific thread of the plurality of threads. The one or more IO requests from the plurality of NVMe IO submission queues may be processed on one or more NVMe storage devices. In response to processing the one or more IO requests from the plurality of NVMe IO submission queues on the one or more NVMe storage devices, an NVMe IO completion entry for each IO request may be provided to the NVMe IO completion queue, thus defining one or more NVMe IO completion entries. Polling, via the plurality of threads, the NVMe IO completion queue based upon, at least in part, the NVMe IO completion queue polling frequency defined for the plurality of threads may include processing, via the plurality of threads, the one or more NVMe IO completion entries from the NVMe IO completion queue. Polling, via the plurality of threads, the NVMe IO completion queue based upon, at least in part, the NVMe IO completion queue polling frequency defined for the plurality of threads may include determining, via a first thread, whether the NVMe IO completion queue is being held by a second thread; and in response to determining that the NVMe IO completion queue is being held by the second thread, forgoing the polling of the NVMe IO completion queue by the first thread.

In another example implementation, a computing system includes at least one processor and at least one memory architecture coupled with the at least one processor, wherein the at least one processor is configured to associate a plurality of NVMe IO submission queues with an NVMe IO completion queue. The at least one processor may be further configured to define an NVMe IO completion queue polling frequency for a plurality of threads configured to provide one or more IO requests to the plurality of NVMe IO submission queues. The at least one processor may be further configured to poll, via the plurality of threads, the NVMe IO completion queue based upon, at least in part, the NVMe IO completion queue polling frequency defined for the plurality of threads.

One or more of the following example features may be included. Each NVMe IO submission queue of the plurality of NVMe IO submission queues may be associated with a specific thread of the plurality of threads. One or more IO requests may be provided, via the plurality of threads, to an NVMe IO submission queue associated with a specific thread of the plurality of threads. The one or more IO requests from the plurality of NVMe IO submission queues may be processed on one or more NVMe storage devices. In response to processing the one or more IO requests from the plurality of NVMe IO submission queues on the one or more NVMe storage devices, an NVMe IO completion entry for each IO request may be provided to the NVMe IO completion queue, thus defining one or more NVMe IO completion entries. Polling, via the plurality of threads, the NVMe IO completion queue based upon, at least in part, the NVMe IO completion queue polling frequency defined for the plurality of threads may include processing, via the plurality of threads, the one or more NVMe IO completion entries from the NVMe IO completion queue. Polling, via the plurality of threads, the NVMe IO completion queue based upon, at least in part, the NVMe IO completion queue polling frequency defined for the plurality of threads may include determining, via a first thread, whether the NVMe IO completion queue is being held by a second thread; and in response to determining that the NVMe IO completion queue is being held by the second thread, forgoing the polling of the NVMe IO completion queue by the first thread.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
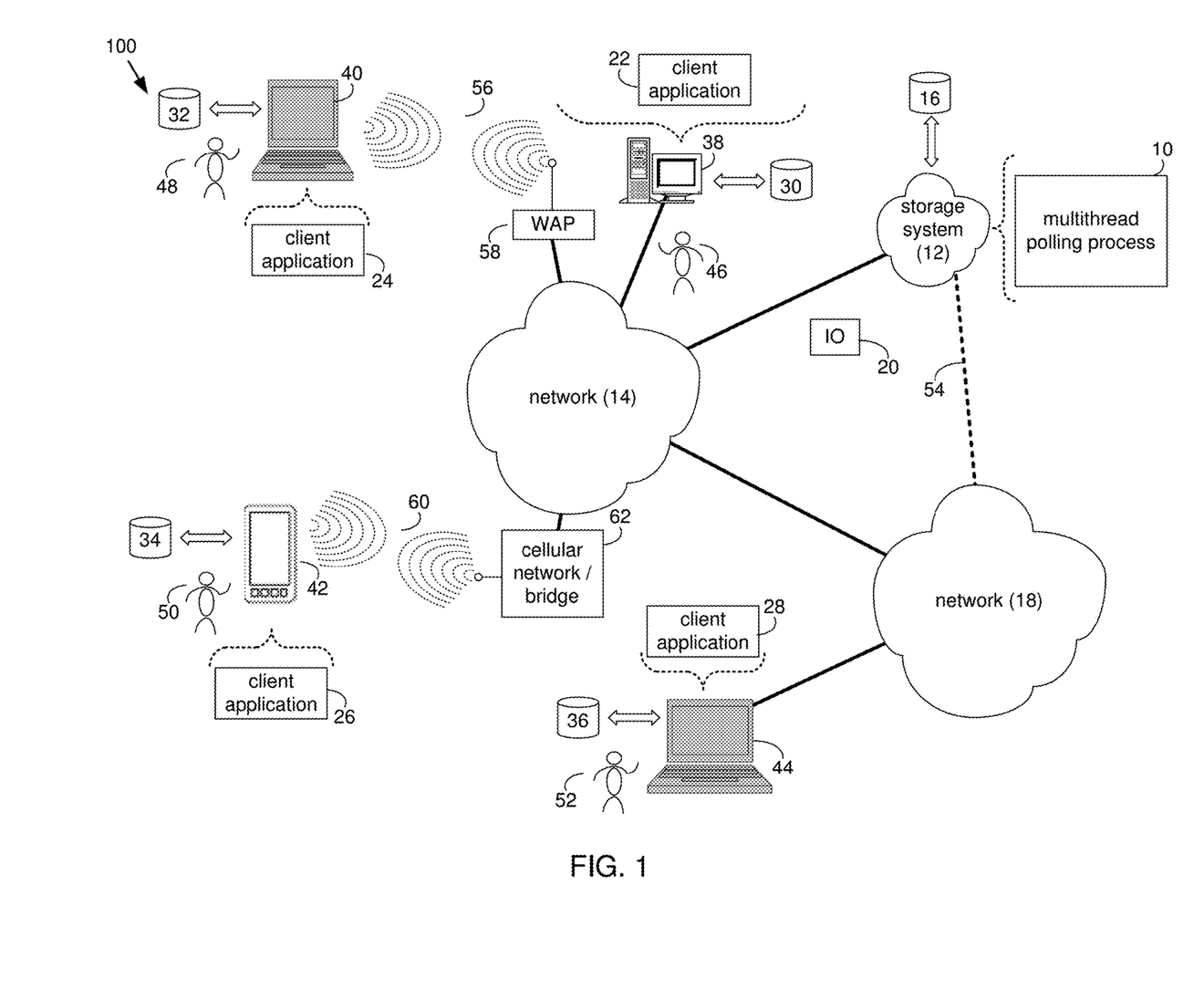
FIG. 1 is an example diagrammatic view of a storage system and a multithread polling process coupled to a distributed computing network according to one or more example implementations of the disclosure.

System Overview:

Referring to FIG. 1, there is shown multithread polling process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of multithread polling process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of multithread polling process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as multithread polling process 10 of FIG. 1, may include but is not limited to, associating a plurality of NVMe IO submission queues with an NVMe IO completion queue. An NVMe IO completion queue polling frequency may be defined for a plurality of threads configured to provide one or more IO requests to the plurality of NVMe IO submission queues. The NVMe IO completion queue may be polled based upon, at least in part, the NVMe IO completion queue polling frequency defined for the plurality of threads.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
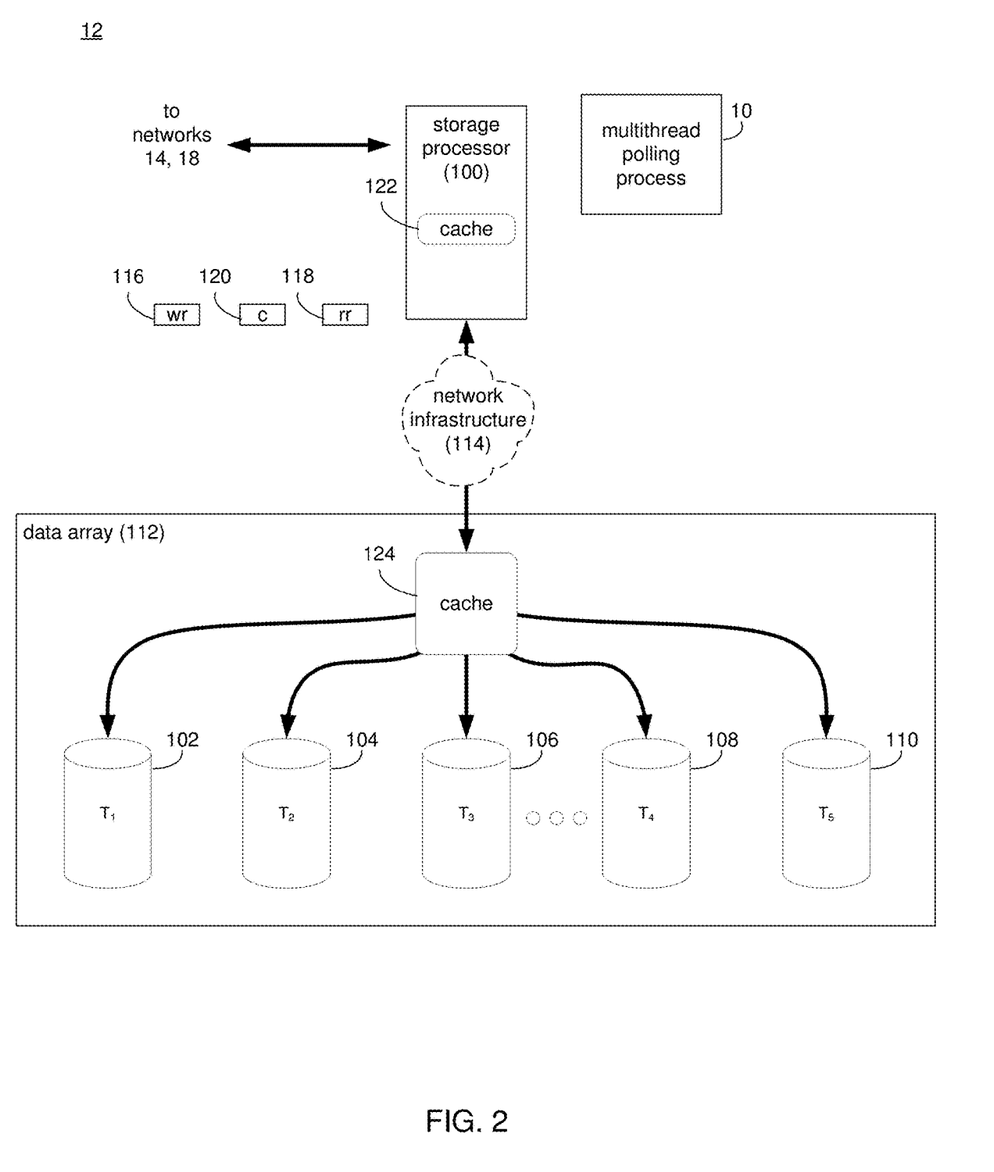
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of multithread polling process 10. The instruction sets and subroutines of multithread polling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of multithread polling process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of multithread polling process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of multithread polling process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Storage System Memory Architecture:

In the context of storage systems, a storage processor (e.g., storage processor 100) may include one or more central processing units (CPUs) with one or more cores, a cache memory system (e.g., cache memory system 122), and one or more network interface cards (NICs). As discussed above and in some implementations, the storage processor (e.g., storage processor 100) may be communicatively coupled with a storage array or data array (e.g., data array 112). In some implementations, the data array (e.g., data array 112) may include one or more storage devices. In some implementations, the data array may be a non-volatile memory disk array with one or more solid-state drives (SSDs). The storage processor 100 may interact with the one or more SSDs via the non-volatile memory express (NVMe) protocol or standard. In this manner, storage devices, such as SSDs, that are configured to communicate with a storage processor via the NVMe protocol may generally be referred to as NVMe storage devices.

As is known in the art, NVMe may generally include a host controller interface and storage protocol configured to transfer data between client systems and SSDs over a Peripheral Component Interconnect Express (PCIe) bus. Referring also to the example of FIG. 3 and in some implementations, the storage system memory architecture (e.g., within the memory system 122 of storage processor 100) may be represented a user space layer (e.g., user space layer 300) and a kernel layer (e.g., kernel layer 302). A user space layer (e.g., user space layer 300) may generally include a set of memory locations in which one or more threads (e.g., threads 304, 306, 308) are executed. A thread (e.g., threads 304, 306, 308) may generally include at least a portion of an executing instance of a program or application. For example and in some implementations, one or more client electronic devices (e.g., client electronic devices 38, 40, 42, 44) may execute one or more programs or applications with data stored in a storage system (e.g., storage system 12) via a storage processor (e.g., storage processor 100). In some implementations, threads 304, 306, 308 may store user data (e.g., from client electronic devices 38, 40, 42, 44) and its metadata on a data array (e.g., data array 112) of storage system 12. As discussed above, the data array may include one or more NVMe storage devices (e.g., storage targets 102, 104, 106, 108, 110).

Figure 3:
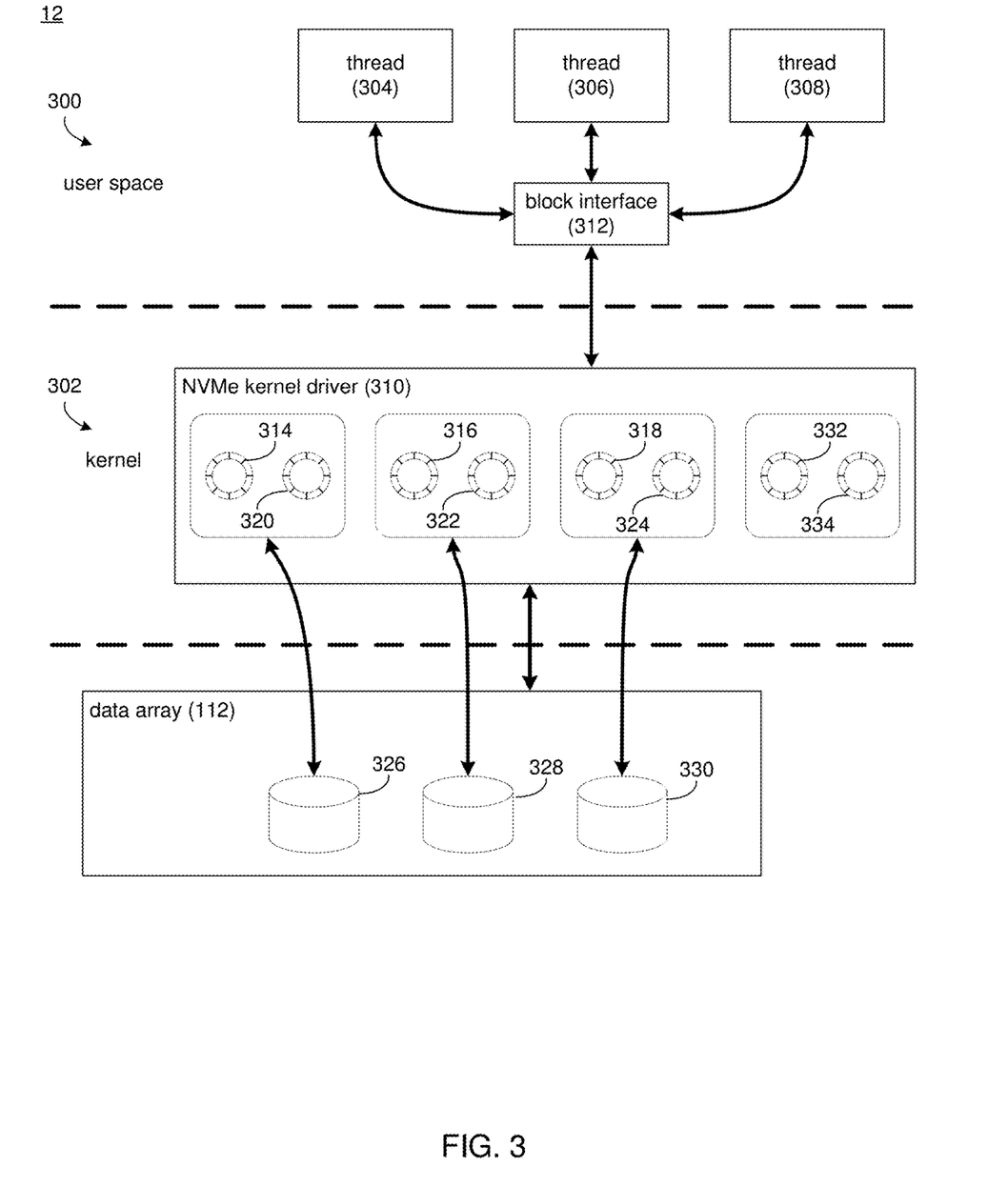
FIG. 3 is an example diagrammatic view of the multithread polling process of FIG. 1 according to one or more example implementations of the disclosure.

In some implementations, the kernel (e.g., kernel 302) may generally include the set of memory locations where the kernel of an operating system (OS) executes or runs and/or where one or more device drivers may execute. As is known in the art, the kernel may manage individual threads within the user space to prevent them from interfering with one another as they communicate data to and from the data array (e.g., data array 112). In some implementations, kernel 302 may be accessed by threads 304, 306, 308 within user space 300 by the use of system calls. Examples of system calls may include IO requests or operations configured to transfer data between a CPU and a peripheral device (e.g., one or more NVMe storage devices). However, it will be appreciated that other system calls are possible within the scope of the present disclosure.

In some implementations, kernel 302 may include an NVMe kernel driver (e.g., a NVMe kernel driver 310) deployed in kernel 302 for communicating data between threads 304, 306, 308 of user space 300 and one or more NVMe storage devices (e.g., storage targets 102, 104, 106, 108, 110). In some implementations, the NVMe kernel driver (e.g., NVMe kernel driver 310) may be a standard Linux® NVMe kernel driver generally available in most storage processors. In some implementations, threads 304, 306, 308 may communicate with NVMe kernel driver 310 via a block interface (e.g., block interface 312).

In some implementations, NVMe kernel driver 310 may include one or more IO submission queues (e.g., IO submission queues 314, 316, 318) and one or more IO completion queues (e.g., IO completion queues 320, 322, 324). In some implementations, IO submission queues 314, 316, 318 and IO completion queues 320, 322, 324 may be organized in pairs (e.g., IO submission queue 314 paired with IO completion queue 320). IO submission queue 314 may generally send one or more IO requests (e.g., IO request 20) to the one or more NVMe storage devices (e.g., storage targets 326, 328, 330) and IO completion queue 320 may generally receive a completion for a corresponding IO request of IO submission queue 314. In some implementations, the one or more IO submission queues and the one or more completion queues may be organized per core of a multi-core CPU, per NVMe storage device, and/or per core and per NVMe storage device (e.g., one or more IO submission queues and one or more IO completion queues for each core and NVMe storage device). In the example of FIG. 3, suppose for example purposes only that the CPU of storage processor 100 is a single core CPU. In this example, a pair of IO submission queues and IO completion queues may be created by NVMe kernel driver 310 for each NVMe storage device (e.g., NVMe storage devices 326, 328, 330) of a data array (e.g., data array 112). However, it will be appreciated that any number of CPU cores and/or NVMe storage devices may be used within the scope of the present disclosure.

In some implementations, NVMe kernel driver 310 may include one or more administrative IO submission queues (e.g., IO submission queue 332) and one or more administrative IO completion queues (e.g., IO completion queue 334) which may or may not be organized in pairs. Administrative IO submission queue 332 may be configured to provide one or more management operations (e.g., create and/or destroy IO submission queues, create and/or destroy IO completion queues, etc.) and administrative IO completion queue 334 may be configured to receive completions for a corresponding IO request of administrative IO submission queue 332.

Figure 4:
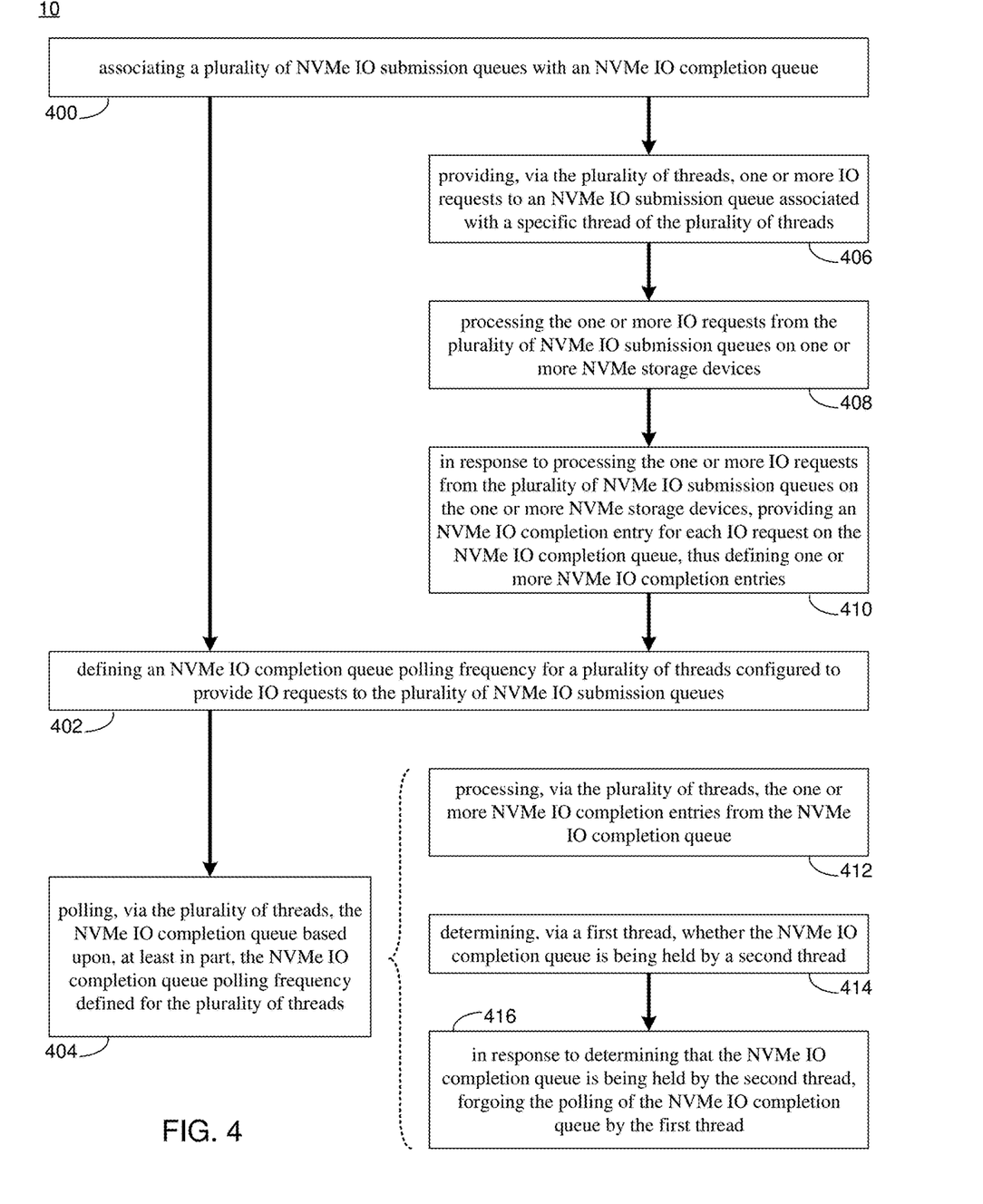
FIG. 4 is an example flowchart of the multithread polling process of FIG. 1 according to one or more example implementations of the disclosure.
Figure 5:
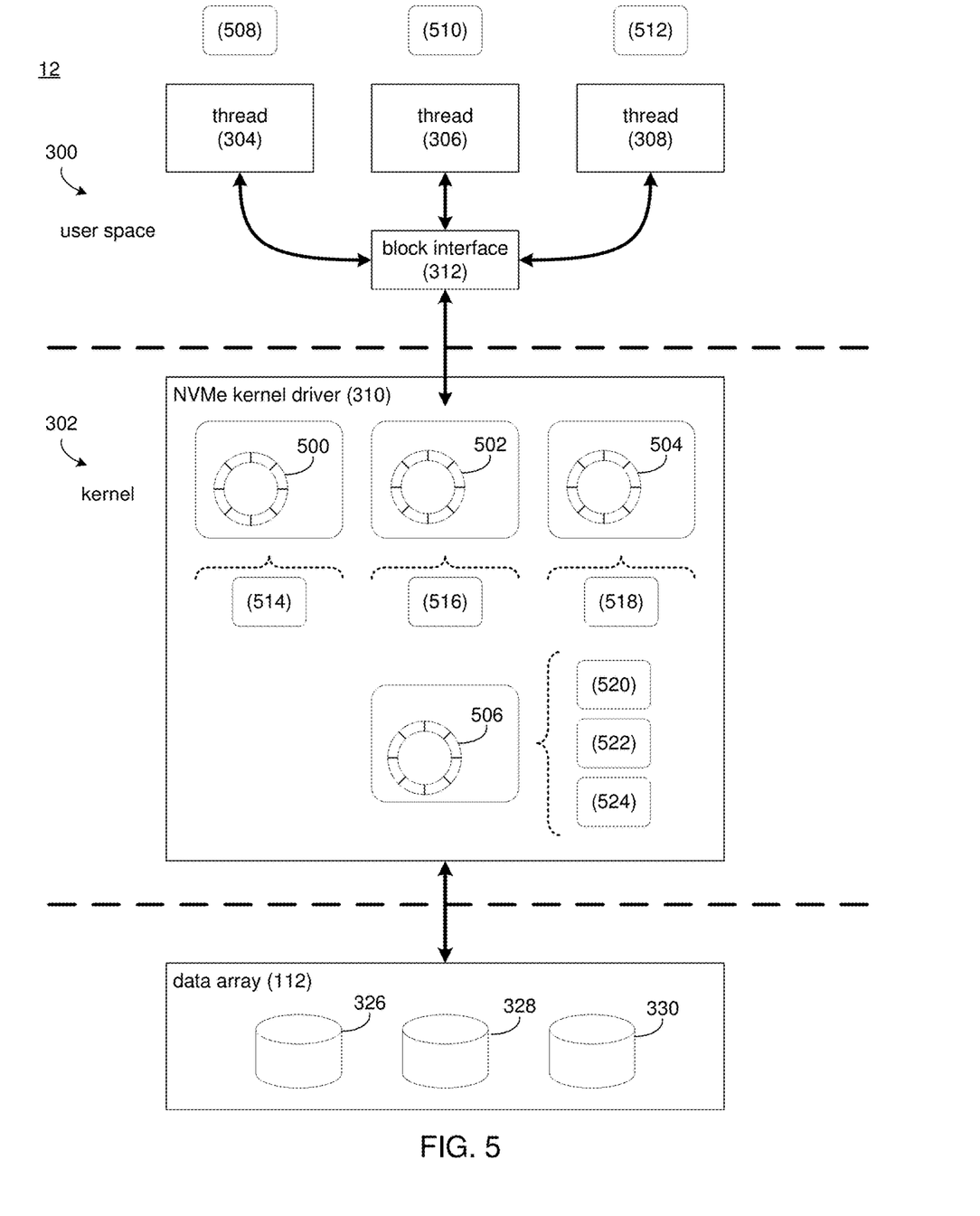
FIG. 5 is an example diagrammatic view of the multithread polling process of FIG. 1 according to one or more example implementations of the disclosure.

The Multithread Polling Process:

Referring also to FIGS. 4-5 and in some implementations, multithread polling process 10 may associate 400 a plurality of NVMe IO submission queues with an NVMe IO completion queue. An NVMe IO completion queue polling frequency may be defined 402 for a plurality of threads configured to provide one or more IO requests to the plurality of NVMe IO submission queues. The NVMe IO completion queue may be polled 404 based upon, at least in part, the NVMe IO completion queue polling frequency defined for the plurality of threads.

As will be discussed in greater detail below, implementations of the present disclosure may allow for an improvement in NVMe disk-IO latency without reducing CPU performance or increasing CPU resource consumption. For example, IO latency is typically divided into three portions: latency associated with submitting an IO request for processing; latency associated with processing the IO request; and the latency associated with completing the IO request. The latency associated with submitting the IO request for processing includes the time that it takes to generate an IO descriptor and place it in an NVMe IO submission queue. A typical value for this latency associated with submitting the IO request is less than one microsecond. The latency associated with processing the IO request includes the time that it takes an NVMe controller to: read the IO descriptor from the NVMe IO submission queue; process the IO request; and to push a completion entry to an NVMe IO completion queue. This latency varies according to many factors but is typically around 100 microseconds. The latency associated with completing the IO request includes the time that it takes the host software to recognize the NVMe IO completion queue entry and to process it. As will be discussed in greater detail below, implementations of the present disclosure may reduce the latency associated with completing the IO request without wasting CPU resources.

According to conventional approaches, each host CPU may have a dedicated NVMe IO submission queue and NVMe IO completion queue pair, such that processing of IO requests by a thread is lockless. Accordingly, conventional approaches typically use interrupts or polling for recognizing entries in the NVMe IO completion queue. When polling, if a task scheduler schedules polling very rapidly, then the added latency from polling may be small. Accordingly, to obtain a low latency, the NVMe IO completion queue may be polled very rapidly. However, a polling attempt consumes CPU time, even if no NVMe IO completion queue entry is recognized.

In some implementations, multithread polling process 10 may associate 400 a plurality of NVMe IO submission queues with an NVMe IO completion queue. Referring also to the example of FIG. 5 and in some implementations, multithread polling process 10 may generate a plurality of NVMe IO submission queues (e.g., NVMe IO submission queues 500, 502, 504). While FIG. 5 shows e.g., three NVMe IO submission queues, it will be appreciated that this is for example purposes only and that any number of NVMe IO submission queues may be generated and/or used within the scope of the present disclosure. In some implementations, multithread polling process 10 may associate 400 each NVMe IO submission queue (e.g., NVMe IO submission queues 500, 502, 504) with a single NVMe IO completion queue (e.g., NVMe IO completion queue 506). In some implementations, multithread polling process 10 may generate NVMe IO completion queue with a size to accommodate the NVMe IO completion entries associated with processing IO requests from the plurality of NVMe IO submission queues. For example, multithread polling process 10 may associate 400 a number of NVMe IO submission queues with a single NVMe IO completion queue based upon, at least in part, the ability for the NVMe IO completion queue to process NVMe IO completion entries for IO requests from the plurality of NVMe IO submission queues. In some implementations, the number of NVMe IO submission queues associated 400 with a particular NVMe IO completion queue may be based upon, at least in part, a number of threads, the size of the NVMe IO completion queue, and/or a NVMe IO completion queue polling frequency. Accordingly, multithread polling process 10 may associate a first set of NVMe IO submission queues with one NVMe IO completion queue and a second set of NVMe IO submission queues with another NVMe IO completion queue. In this manner, multithread polling process 10 may group multiple NVMe IO submission queues with a single NVMe IO completion queue.

In some implementations, each NVMe IO submission queue of the plurality of NVMe IO submission queues may be associated with a specific thread of the plurality of threads. As discussed above and is known in the art, a thread, or thread of execution, may include a sequence of programmed instructions that may be managed independently by a scheduler component of an operating system. In some implementations, a CPU may execute a plurality of threads or threads of execution. For example, a thread may provide one or more IO requests from a host to an NVMe IO submission queue for processing on one or more NVMe storage devices. In some implementations, each NVMe IO submission queue may be associated with a specific, unique thread of the plurality of threads.

Referring again to FIG. 5 and in some implementations, a CPU may include one or more cores configured to execute a plurality of threads (e.g., threads 304, 306, 308). In some implementations, each thread may be executed on a dedicated CPU or CPU core of a multicore CPU. In some implementations, NVMe IO submission queue 500 may be associated with thread 304; NVMe IO submission queue 502 may be associated with thread 306; and NVMe IO submission queue 504 may be associated with thread 308. While FIG. 5 shows three threads, it will be appreciated that this is for example purposes only and that any number of threads may be used within the scope of the present disclosure.

In some implementations, multithread polling process 10 may provide 406, via the plurality of threads, one or more IO requests to an NVMe IO submission queue associated with a specific thread of the plurality of threads. For example, each thread may be configured to provide IO requests from a host to the NVMe IO submission queue associated with that thread. Referring again to FIG. 5 and in some implementations, thread 304 may provide 406 one or more IO requests (e.g., IO request 508) to NVMe IO submission queue 500; thread 306 may provide 406 one or more IO requests (e.g., IO request 510) to NVMe IO submission queue 502; and thread 308 may provide 406 one or more IO requests (e.g., IO request 512) to NVMe IO submission queue 504. In some implementations, providing an IO request to an NVMe IO submission queue may include pushing an IO descriptor associated with the IO request onto the NVMe IO submission queue. For example, thread 304 may provide one or more IO descriptors (e.g., IO descriptor 514) associated with IO request 508 to NVMe IO submission queue 500; thread 306 may provide one or more IO descriptors (e.g., IO descriptor 516) associated with IO request 510 to NVMe IO submission queue 502; and thread 308 may provide one or more IO descriptors (e.g., IO descriptor 516) associated with IO request 512 to NVMe IO submission queue 504.

In some implementations, multithread polling process 10 may process 408 the one or more IO requests from the plurality of NVMe IO submission queues on one or more NVMe storage devices. For example, multithread polling process 10 may, via an NVMe controller, read the one or more IO descriptors from the plurality of NVMe IO submission queues. The NVMe controller may process 408 the one or more IO requests associated with the one or more IO descriptors read from the plurality of NVMe IO submission queues on the one or more NVMe storage devices. Referring again to the example of FIG. 5 and in some implementations, multithread polling process 10 may process 408 the one or more IO requests (e.g., IO requests 508, 510, 512) from the plurality of NVMe IO submission queues (e.g., NVMe IO submission queues 500, 502, 504) on the one or more NVMe storage devices (e.g., NVMe storage devices 326, 328, 330).

In some implementations and in response to processing the one or more IO requests from the plurality of NVMe IO submission queues on the one or more NVMe storage devices, multithread polling process 10 may provide 410 an NVMe IO completion entry for each IO request to the NVMe IO completion queue, thus defining one or more NVMe IO completion entries. For example, for each IO requests processed by the NVMe controller, multithread polling process 10 may provide 410 an NVMe IO completion entry to the NVMe IO completion queue. Referring again to FIG. 5 and in some implementations, multithread polling process 10 may provide 410 an NVMe IO completion entry (e.g., NVMe IO completion entry 520) to NVMe IO completion queue 506 in response to processing 408 IO request 508 on the one or more NVMe storage devices. Similarly, multithread polling process 10 may provide 410 an NVMe IO completion entry (e.g., NVMe IO completion entry 522) to NVMe IO completion queue 506 in response to processing 408 IO request 510 on the one or more NVMe storage devices and may provide 410 an NVMe IO completion entry (e.g., NVMe IO completion entry 524) to NVMe IO completion queue 506 in response to processing 408 IO request 512 on the one or more NVMe storage devices.

In some implementations, multithread polling process 10 may define 402 an NVMe IO completion queue polling frequency for a plurality of threads configured to provide one or more IO requests to the plurality of NVMe IO submission queues. In some implementations, the NVMe IO completion queue polling frequency may describe how often each thread polls the NVMe IO completion queue for any NVMe IO completion entries. As discussed above, more frequent polling may generally lower IO latency but may require more CPU resources. With conventional approaches utilizing dedicated NVMe IO submission queue and NVMe IO completion queue pairs, the IO latency associated with processing NVMe IO completion entries may be directly related to the NVMe IO completion queue polling frequency such that a low NVMe IO completion queue polling frequency results in low IO latency. However and as will be discussed in greater detail below, with each thread polling the same NVMe IO completion queue, a low NVMe IO completion queue polling frequency may be defined without reducing IO latency. For example, suppose there are 10 threads, each with an NVMe IO completion queue polling frequency of e.g., 100 microseconds on the same NVMe IO completion queue. In this example, because the polling by each thread doesn't depend on the other threads, the effective polling time for the NVMe IO completion queue would be 10 microseconds as shown below in Equation 1:

$$\frac{100 \text{ microseconds}}{10 \text{ threads}} = 10 \text{ microseconds} \tag{1}$$

This can be generalized as shown below in Equation 2:

$$\frac{NVMeIO \text{ completion queue polling frequency}}{\text{Number of threads}} = \text{Effective polling time} \tag{2}$$

In some implementations, multithread polling process 10 may define 402 the NVMe IO completion queue polling frequency automatically. For example, multithread polling process 10 may define 402 the NVMe IO completion queue polling frequency as a default value (e.g., ranging from e.g., 100 microseconds to e.g., 300 microseconds). However, it will be appreciated that the NVMe IO completion queue polling frequency may be defined 402 as any value, within the scope of the present disclosure. In some implementations, the NVMe IO completion queue polling frequency may be dynamically adjusted or redefined 402 by multithread polling process 10 based on the number of threads, the size of the NVMe IO completion queue, and/or the measured IO latency. In another example, the NVMe IO completion queue polling frequency may be user-defined (e.g., received via a graphical user interface).

In some implementations, multithread polling process 10 may poll 404, via the plurality of threads, the NVMe IO completion queue based upon, at least in part, the NVMe IO completion queue polling frequency defined for the plurality of threads. As discussed above with conventional approaches, a lower polling frequency may result in higher IO latency by consuming more CPU resources. However, to avoid the high IO latency impact of a low polling frequency, multithread polling process 10 may poll 404 the same NVMe IO completion queue with each thread. As shown above in Equation 2, with each thread polling the same NVMe IO completion queue, the effective polling time may be reduced which may reduce the IO latency. Accordingly, multithread polling process 10 may avoid wasting a lot of CPU time in order to reduce the IO latency. Referring again to FIG. 5 and in some implementations, threads 304, 306, 308 may poll 404 NVMe IO completion queue 506 based upon, at least in part, the NVMe IO completion queue polling frequency defined for the plurality of threads.

In some implementations, polling 404, via the plurality of threads, the NVMe IO completion queue based upon, at least in part, the NVMe IO completion queue polling frequency defined for the plurality of threads may include processing 412, via the plurality of threads, the one or more NVMe IO completion entries from the NVMe IO completion queue. For example, with each thread polling 404 from the same NVMe IO completion queue, multithread polling process 10 may process 412 the one or more NVMe IO completion entries from the NVMe IO completion queue with any thread. In this manner, the NVMe IO completion entry does not have to be processed by the same thread that submitted the IO request. Referring again to FIG. 5 and in one example, suppose that thread 306 polls 404 NVMe IO completion queue 506 at the NVMe IO completion queue polling frequency defined for the plurality of threads. In this example, suppose that multithread polling process 10 provides 410 NVMe IO completion entry 520 to NVMe IO completion queue 506 in response to processing 408 IO request 508 on the one or more NVMe storage devices. In this example, thread 306 may process 412 NVMe IO completion entry 520 associated with IO request 508 even though a different thread (i.e., thread 304) originally provided IO request 508 to the one or more NVMe IO submission queues.

In some implementations, polling 404, via the plurality of threads, the NVMe IO completion queue based upon, at least in part, the NVMe IO completion queue polling frequency defined for the plurality of threads may include determining 414, via a first thread, whether the NVMe IO completion queue is being held by a second thread. For example, with each thread polling the same NVMe IO completion queue, multithread polling process 10 may utilize an atomic test-and-set guard to prevent concurrent polling of the NVMe IO completion queue. Continuing with the above example, suppose thread 308 polls NVMe IO completion queue 506. Further suppose that, while thread 308 is polling NVMe IO completion queue 506, thread 304 attempts to poll NVMe IO completion queue 506. In this example, multithread polling process 10 may attempt to acquire the test-and-set lock to poll NVMe IO completion queue 506 but is unable to obtain the test-and-set lock because thread 308 is polling NVMe IO completion queue 506. Accordingly, multithread polling process 10 may determine 414, via a first thread (e.g., thread 304), that NVMe IO completion queue 506 is being held by a second thread (e.g., thread 308).

In some implementations and in response to determining 414 that the NVMe IO completion queue is being held by the second thread, multithread polling process 10 may forgo 416 the polling of the NVMe IO completion queue by the first thread. For example, if a first thread tries to acquire the test-and-set lock while it is held by a second thread that is polling the NVMe IO completion queue, there is no reason for the first thread to spin and wait. Accordingly, the first thread may give up or forgo the polling attempt. Continuing with the above example, suppose that multithread polling process 10 determines 414 that NVMe IO completion queue 506 is being held by thread 308 when thread 304 is scheduled to poll NVMe IO completion queue 506. In this example and in response to determining that NVMe IO completion queue 506 is being held by thread 308, multithread polling process 10 may forgo 416 the polling of NVMe IO completion queue 506 by thread 304. In this manner, multithread polling process 10 may prevent CPU resources from being wasted by forgoing 416 the polling of the NVMe IO completion queue instead of having a thread spin and wait until a previous thread finishes polling the NVMe IO completion queue.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
   associating a plurality of NVMe IO submission queues with an NVMe IO completion queue, wherein each NVMe IO submission queue of the plurality of NVMe IO submission queues is associated with a specific unique thread of a plurality of threads;
   defining an NVMe IO completion queue polling frequency for the plurality of threads configured to provide one or more IO requests to the plurality of NVMe IO submission queues; and
   polling, via the plurality of threads, the NVMe IO completion queue based upon, at least in part, the NVMe IO completion queue polling frequency defined for the plurality of threads.

2. The computer-implemented method of claim 1, further comprising: providing, via the plurality of threads, the one or more IO requests to an NVMe IO submission queue associated with a specific thread of the plurality of threads.

3. The computer-implemented method of claim 2, further comprising
   processing the one or more IO requests from the plurality of NVMe IO submission queues on one or more NVMe storage devices.

4. The computer-implemented method of claim 3, further comprising:
   in response to processing the one or more IO requests from the plurality of NVMe IO submission queues on the one or more NVMe storage devices, providing an NVMe IO completion entry for each IO request to the NVMe IO completion queue, thus defining one or more NVMe IO completion entries.

5. The computer-implemented method of claim 4, wherein polling, via the plurality of threads, the NVMe IO completion queue based upon, at least in part, the NVMe IO completion queue polling frequency defined for the plurality of threads includes:

processing, via the plurality of threads, the one or more NVMe IO completion entries from the NVMe IO completion queue.

6. The computer-implemented method of claim 1, wherein polling, via the plurality of threads, the NVMe IO completion queue based upon, at least in part, the NVMe IO completion queue polling frequency defined for the plurality of threads includes:
   determining, via a first thread, whether the NVMe IO completion queue is being held by a second thread; and
   in response to determining that the NVMe IO completion queue is being held by the second thread, forgoing the polling of the NVMe IO completion queue by the first thread.

7. A computer program product residing on a non-transitory computer readable medium having a plurality of instructions stored thereon which, when executed by a processor, cause the processor to perform operations comprising:
   associating a plurality of NVMe IO submission queues with an NVMe IO completion queue, wherein each NVMe IO submission queue of the plurality of NVMe IO submission queues is associated with a specific unique thread of a plurality of threads;
   defining an NVMe IO completion queue polling frequency for a plurality of threads configured to provide one or more IO requests to the plurality of NVMe IO submission queues; and
   polling, via the plurality of threads, the NVMe IO completion queue based upon, at least in part, the NVMe IO completion queue polling frequency defined for the plurality of threads.

8. The computer program product of claim 7, wherein the operations further comprise: providing, via the plurality of threads, the one or more IO requests to an NVMe IO submission queue associated with a specific thread of the plurality of threads.

9. The computer program product of claim 8, wherein the operations further comprise:
   processing the one or more IO requests from the plurality of NVMe IO submission queues on one or more NVMe storage devices.

10. The computer program product of claim 9, wherein the operations further comprise:
    in response to processing the one or more IO requests from the plurality of NVMe IO submission queues on the one or more NVMe storage devices, providing an NVMe IO completion entry for each IO request to the NVMe IO completion queue, thus defining one or more NVMe IO completion entries.

11. The computer program product of claim 10, wherein polling, via the plurality of threads, the NVMe IO completion queue based upon, at least in part, the NVMe IO completion queue polling frequency defined for the plurality of threads includes:
    processing, via the plurality of threads, the one or more NVMe IO completion entries from the NVMe IO completion queue.

12. The computer program product of claim 7, wherein polling, via the plurality of threads, the NVMe IO completion queue based upon, at least in part, the NVMe IO completion queue polling frequency defined for the plurality of threads includes:
    determining, via a first thread, whether the NVMe IO completion queue is being held by a second thread; and
    in response to determining that the NVMe IO completion queue is being held by the second thread, forgoing the polling of the NVMe IO completion queue by the first thread.

13. A computing system comprising:
    a memory; and
    a processor configured to associate a plurality of NVMe IO submission queues with an NVMe IO completion queue, wherein each NVMe IO submission queue of the plurality of NVMe IO submission queues is associated with a specific unique thread of a plurality of threads, wherein the processor is further configured to define an NVMe IO completion queue polling frequency for a plurality of threads configured to provide one or more IO requests to the plurality of NVMe IO submission queues, and wherein the processor is further configured to poll, via the plurality of threads, the NVMe IO completion queue based upon, at least in part, the NVMe IO completion queue polling frequency defined for the plurality of threads.

14. The computing system of claim 13, wherein the processor is further configured to: provide, via the plurality of threads, the one or more IO requests to an NVMe IO submission queue associated with a specific thread of the plurality of threads.

15. The computing system of claim 14, wherein the processor is further configured to:
    process the one or more IO requests from the plurality of NVMe IO submission queues on one or more NVMe storage devices.

16. The computing system of claim 15, wherein the processor is further configured to:
    in response to processing the one or more IO requests from the plurality of NVMe IO submission queues on the one or more NVMe storage devices, provide an NVMe IO completion entry for each IO request to the NVMe IO completion queue, thus defining one or more NVMe IO completion entries.

17. The computing system of claim 16, wherein polling, via the plurality of threads, the NVMe IO completion queue based upon, at least in part, the NVMe IO completion queue polling frequency defined for the plurality of threads includes:
    processing, via the plurality of threads, the one or more NVMe IO completion entries from the NVMe IO completion queue.

* * * * *